United States Patent [19]

Vulpe

[11] Patent Number: 4,839,494
[45] Date of Patent: Jun. 13, 1989

[54] ELECTROMAGNETIC CONTAINER SEALING APPARATUS

[75] Inventor: Alexei Vulpe, Dallas, Tex.

[73] Assignee: Ntronix, Inc., Nashville, Tenn.

[21] Appl. No.: 202,231

[22] Filed: Jun. 3, 1988

[51] Int. Cl.$^4$ ............................................. H05B 6/80
[52] U.S. Cl. ...................... 219/10.55 A; 219/10.55 F; 219/10.53; 156/380.9; 156/274.4
[58] Field of Search ................. 219/10.55 F, 10.55 A, 219/10.55 R, 10.55 D, 10.55 E, 10.53; 156/272.4, 273.7, 274.4, 379.6, 379.7, 380.2, 380.9, 69

[56] References Cited

U.S. PATENT DOCUMENTS

| | | | |
|---|---|---|---|
| 2,608,637 | 8/1952 | Dakin et al. | 219/10.55 R |
| 3,765,985 | 10/1973 | Siard et al. | 156/379.8 |
| 3,928,109 | 12/1975 | Pollock et al. | 156/272.4 |
| 3,999,026 | 12/1976 | Böling | 219/10.55 A |
| 4,100,386 | 7/1978 | Bardet | 219/10.55 A |
| 4,609,417 | 9/1986 | Smith | 156/69 |

Primary Examiner—Philip H. Leung
Attorney, Agent, or Firm—David H. Judson

[57] ABSTRACT

A sealing apparatus is described for use with a container having an open end with a sealing rim therearound, a closure on the open end and a membrane in the closure disposed against the sealing rim, the membrane having at least a plastic layer adapted for being sealed to the sealing rim of the container and a layer formed of a high dielectric loss tangent material. Preferably, it includes a resonant cavity having first and second ends, a central axis and an inner peripheral surface located around the central axis, the first end of the resonant cavity having an opening for receiving the open end of the container having the closure thereon. It also includes an applicator electrode extending into the resonant cavity from the second end thereof and having an open end with a sealing rim therearound for supporting the container. The sealing rim includes an outer edge located a predetermined length from the second end of the cavity along an outer peripheral surface of the electrode and located from the inner peripheral surface of the cavity by the predetermined length. A source of electromagnetic energy is connected to the electrode for exciting the cavity with electromagnetic energy at a predetermined frequency to seal the layer to the sealing rim of the container. An effective seal is provided by matching the predetermined length to a substantially quarter wavelength at the selected frequency of the electromagnetic energy in order to obtain a substantially maximized heating effect proximate the desired seal.

12 Claims, 2 Drawing Sheets

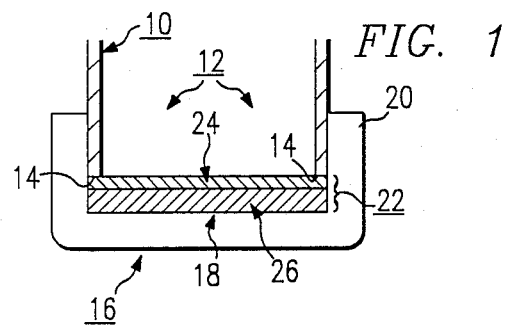
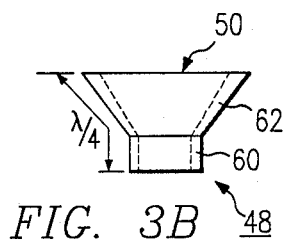
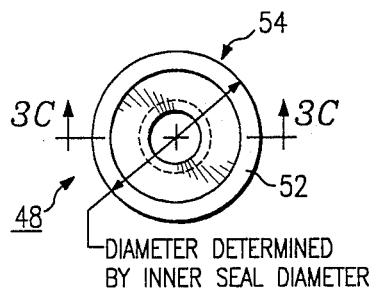
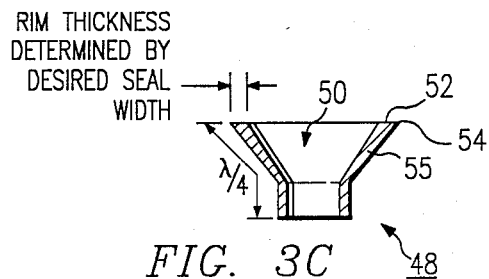
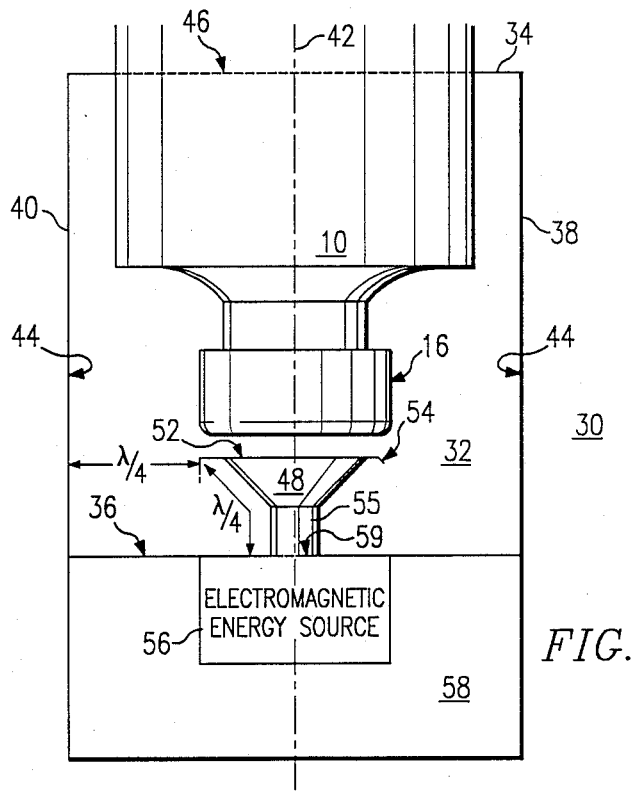

ELECTROMAGNETIC CONTAINER SEALING APPARATUS

TECHNICAL FIELD

The present invention relates generally to selective heating of materials using electromagnetic energy and more particularly to a container sealing apparatus for applying a plastic seal to the mouth of a container using microwave or RF energy.

BACKGROUND OF THE INVENTION

The use of microwaves to dielectrically heat materials in a resonant cavity is well known in the prior art. In such systems, an energy source, located near the resonant cavity, generates microwaves which are in turn transmitted to the cavity through an associated waveguide. The material to be heated is typically placed adjacent to or in the resonant cavity and is directly heated by the applied microwave energy.

Several different types of resonant cavities have been used in the prior art depending on the heating application. One major type is a so called "multimode" cavity. This type of cavity generally has a square or rectangular cross-section with dimensions which are usually large compared to the microwave wavelength. The cavity is designed such that a large number of resonant standing wave modes propagate simultaneously, thus producing a relatively uniform electric field distribution throughout the cavity. A mechanical mode stirrer is often used in conjunction with a multimode cavity to further homogenize the electric field distribution. Because the dielectric heating effect is proportional to the square of the electric field strength, a relatively uniform heating effect is provided throughout the cavity.

Another type of cavity which has been used in microwave dielectric heating is a "single mode" cavity. This type of cavity is designed such that superposition of certain in-phase incident and reflected waves gives rise to a standing wave pattern which, for some simple structures, is well defined in the cavity. The precise knowledge of the electromagnetic field enables the user to place the dielectric material under treatment in a position of enhanced electric field strength for optimum transfer of electromagnetic energy. In general, for the same power applied, a single-mode resonant heating cavity establishes much higher electric field strengths than a corresponding multimode cavity. Single mode cavities are thus more advantageous than multimode cavities for heating low loss tangent dielectric materials. They are also, in general, very compact and have extremely high power densities.

While the use of single-mode and multimode resonant cavity devices for heating has been practiced for some time, the state-of-the-art in microwave heating is presently such that it has not been possible to use such devices to apply a plastic seal to the mouth of a container. Instead, prior art techniques for sealing a plastic sheet to a container mouth typically involve a process wherein a metallic/non-metallic laminate liner is first formed and inserted into a lip of a container closure. The closure is then attached to the container whereupon a low frequency electrical induction system is used to heat the metallic portion of the liner supported in the container closure. This operation causes the adjacent non-metallic portion of the liner to melt and thus seal the container mouth. This process, shown in U.S. Pat. No. 3,928,109 to Pollack et al, is disadvantageous because the metallic/non-metallic liner is costly to produce and because induction heating does not produce a satisfactory seal in a timely and economical manner.

It would therefore be advantageous to develop an apparatus for sealing a container which obviates these and other problems associated with prior art techniques and which enables a plastic sheet to be sealed directly to the container through application of electromagnetic energy.

BRIEF SUMMARY OF THE INVENTION

It is therefore an object of the present invention to provide an electromagnetic container sealing apparatus which uses either microwave or radio frequency energy to seal a thin plastic sheet to the mouth of a container.

It is yet another object of the invention to provide suitable structure in a substantially single-mode resonant cavity for locating the mouth of a container in an area of enhanced electromagnetic dielectric heating for creating a sealing interface between the container and a plastic sheet.

It is still another object of the invention to provide a novel applicator electrode for use in a single-mode resonant cavity for producing an area of enhanced electric field strength around the mouth of a container to be sealed with a plastic seal.

These and other objects are achieved by providing a sealing apparatus according to the present invention for use with a container and a closure therefor. The container has an open end with a sealing rim therearound, and the closure is supported on the open end of the container in a known manner. A membrane supported in the closure is disposed against the sealing rim, the membrane having at least a plastic layer adapted for being sealed to the sealing rim of the container and a layer formed of a high dielectric loss tangent material. Preferably, the apparatus includes a resonant cavity having first and second ends, a central axis and an inner peripheral surface located around the central axis, the first end of the resonant cavity having an opening for receiving the open end of the container having the closure thereon. The apparatus also includes an applicator electrode extending into the resonant cavity from the second end thereof and having an open end with a sealing rim therearound, the sealing rim for supporting the container and including an outer edge. According to the invention, the outer edge of the sealing rim is located a predetermined length from the second end of the cavity along an outer peripheral surface of the electrode. Moreover, the outer edge of the sealing rim is also located from the inner peripheral surface of the cavity by the predetermined length. A source of electromagnetic energy is connected to the electrode for exciting the cavity with electromagnetic energy at a predetermined frequency to thereby seal the layer to the sealing rim of the container. An enhanced heating effect is provided in the area of the seal by selecting the predetermined length to be substantially one quarter wavelength ($\lambda/4$) at the selected frequency of the electromagnetic energy.

The foregoing has outlined rather broadly the more pertinent and important features of the present invention in order that the Detailed Description that follows may be better understood and such that the present contribution to the art can be more fully appreciated. Additional features of the invention will be described hereinafter which form the subject of the claims of the invention.

BRIEF DESCRIPTION OF THE DRAWINGS

For a more complete understanding of the nature and objects of the present invention, reference should be made to the following Detailed Description taken in connection with the accompanying Drawings in which:

FIG. 1 is a cross sectional view of a portion of a typical container, and closure therefor, for use with the sealing apparatus of the present invention;

FIG. 2 is a cross-sectional view of the preferred embodiment of the sealing apparatus of the invention for sealing a plastic sheet over the open end of the container of FIG. 1;

FIGS. 3A-3C represent a top view, a side view and a sectional view, respectively, of a preferred applicator electrode of the sealing apparatus of FIG. 2.

Similar reference characters refer to similar parts through the several views of the drawings.

DETAILED DESCRIPTION

Figure 4:
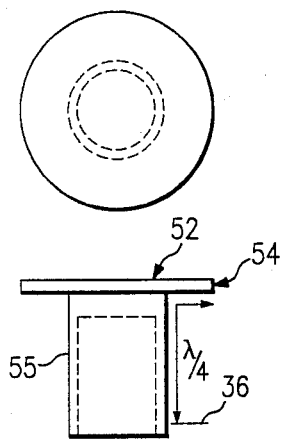
FIGS. 4-9 show alternate embodiments of the applicator electrode for use in the sealing apparatus of FIG. 2.

In the preferred embodiment, the sealing apparatus of the present invention is designed for use with a typical cylindrical container and closure therefor, substantially as shown in FIG. 1, although other container geometries are well within the scope of the present invention. Specifically, container 10 includes an open end 12 with a sealing rim 14 therearound. A closure 16 for use with the container 10 includes an end panel 18 and a peripheral skirt 20 for supporting a membrane 22 in the closure 16 disposed against the sealing rim 14 of the container 10. Although not meant to be limiting, preferably the membrane 22 has at least a plastic layer 24 adapted for being sealed to the sealing rim 14 of the container 10, as well as a layer 26 formed of a high dielectric loss tangent material. Alternatively, the membrane may comprise a single layer of plastic material having a high dielectric loss tangent.

Referring now to both FIGS. 1 and 2, a cross sectional view is shown of the typical preferred embodiment of a sealing apparatus 30 for sealing containers with a cylindrical sealing rim 14 according to the present invention. The sealing apparatus 30 preferably includes a substantially single-mode resonant cavity 32 defined by first and second ends 34 and 36. The cavity may also include first and second sides 38 and 40. The resonant cavity and the container sealing rim are therefore substantially cylindrical in shape around a central axis 42, and the cavity 32 includes an inner peripheral surface 44 located around the central axis 42. As seen in FIG. 2, the first end 34 of the resonant cavity 32 has an opening 46 for receiving the open end 12 of the container 10 having the closure 16 thereon. The sealing apparatus 30 also advantageously includes an applicator electrode 48 extending into the resonant cavity 32 from the second end 36 thereof and preferably having an open end 50 (see FIG. 3C) with a sealing rim 52 therearound. The sealing rim 52 may support the container 10 directly or may be spaced from the end panel 18 of the container closure 16. The sealing rim 52 includes an outer edge 54 as will described in more detail below. The applicator electrode 48 also includes an outer peripheral surface 55. According to a feature of the invention, the outer edge 54 of the sealing rim 52 is located a predetermined length from the second end 36 of the cavity (i.e., the point where the electrode enters the cavity) along the outer peripheral surface 55. Moreover, the outer edge 54 is also located from the inner peripheral surface 44 of the cavity 32 by the same predetermined length of the outer peripheral surface 55 of the applicator electrode. The sealing apparatus 30 includes a suitable source 56 of electromagnetic energy supported in a base 58 of the apparatus and connected to the electrode 48 via a 50 ohm aperture 59 for exiting the cavity 32. This operation seals the plastic layer 24 to the sealing rim of the container 10 as will be described in more detail below.

It has been found that the applicator electrode placement shown in FIG. 2 is advantageous and provides for an enhanced heating effect in and adjacent to the container closure 16 to thereby seal the plastic layer 24 to the sealing rim 14 of the container 10 in a short period of time. This advantage is achieved by insuring that the length of the applicator electrode 48 from the point where the electrode enters the second end 36 of the cavity to the outer edge 54 (along the outer peripheral surface 55) is substantially equal to the distance from the outer edge 54 of the electrode to the inner peripheral surface 44 of the cavity 32, with this length being substantially equal to a quarter wavelength at a selected frequency of electromagnetic energy generated by the energy source 56. This structure and placement of the applicator electrode provides a maximization (i.e., a focussing) of the generated electric field precisely in the area of the sealing rim 14 of the container 10, thereby reducing the amount of total energy and time required to produce an adequate seal.

Figure 5:
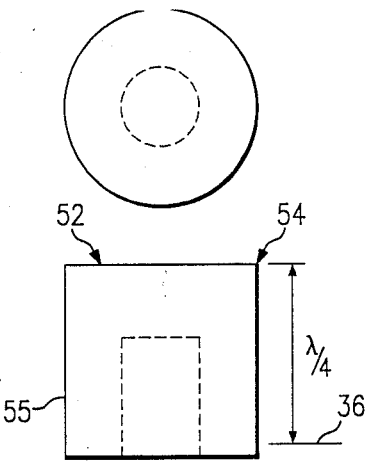
Figure 6:
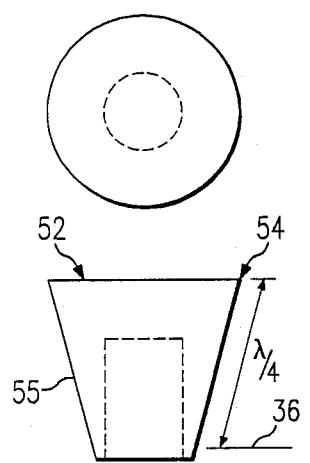
Figure 7:
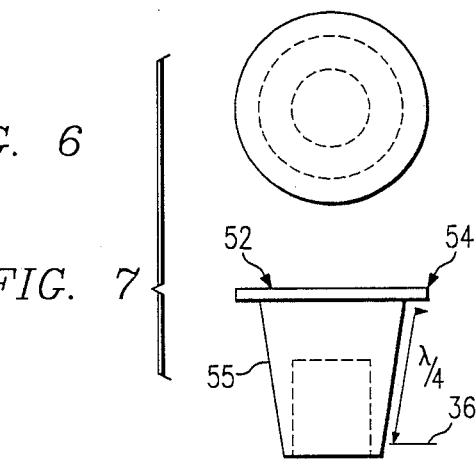
Figure 8:
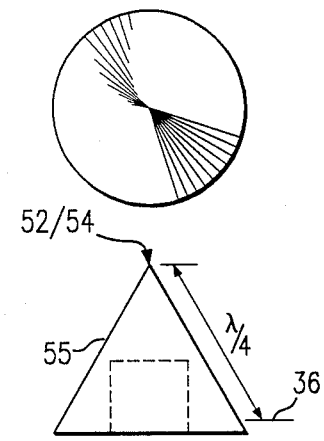
Figure 9:
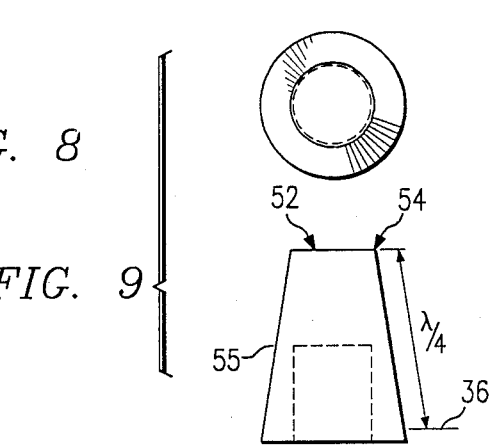

Referring now to FIGS. 3A-3C, a typical preferred structure of the applicator electrode 48 for sealing a cylindrical container is shown. Preferably, the sealing rim 52 of the electrode has a predetermined thickness substantially equal to the desired seal width; i.e., the thickness of the sealing rim of the container 10. The electrode 48 also advantageously includes a substantially cylindrical portion 60 and a transitional portion 62 attached to the cylindrical portion 60, the transitional portion 62 terminating in the sealing rim at the end 50 of the electrode 48. While this structure is shown as a typical example, it should be appreciated that other electrode structures, e.g., the structures shown in FIGS. 4-9, may be used. For example, FIG. 5 shows a cylindrical shaped electrode while FIG. 8 shows a conical shaped electrode. Any of the electrode geometries shown in FIGS. 3-9 will provide an efficient seal provided that the selected geometry matches the shape of the container sealing rim and the outer edge of the electrode is located along the outer peripheral surface thereof (and spaced from the inner peripheral surface 44 of the cavity) as described above.

Therefore, according to the preferred embodiment of the invention, a sealing apparatus is provided for use with a container having an open end with a sealing rim therearound, a closure on the open end and a membrane in the closure disposed against the sealing rim, the membrane having at least a plastic layer adapted for being sealed to the sealing rim of the container and a layer formed of a high dielectric loss tangent material. Preferably, the apparatus includes a resonant cavity having first and second ends, a central axis and an inner peripheral surface located around the central axis, the first end of the resonant cavity having an opening for receiving the open end of the container having the closure thereon. The apparatus also includes an applicator electrode extending into the resonant cavity from the second end thereof and having an open end with a sealing rim therearound. The sealing rim includes an outer edge located a predetermined length from the second end of the cavity along the outer peripheral surface of the electrode and located from the inner peripheral surface of the cavity by the predetermined length. A source of electromagnetic energy is connected to the electrode for exciting the cavity with electromagnetic energy at a predetermined frequency to thereby seal the layer to the sealing rim of the container. An area of enhanced heating effect is provided in the area of the seal by selecting the predetermined length to be substantially one quarter wavelength ($\lambda/4$) at the selected frequency of the electromagnetic energy.

It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

I claim:

1. A sealing apparatus for use with a container having an open end with a sealing rim therearound, a closure on the open end and a membrane in the closure disposed against the sealing rim, the membrane having at least one plastic layer adapted for being sealed to the sealing rim of the container, the sealing apparatus comprising:
    a resonant cavity having first and second ends, a central axis and an inner peripheral surface located around the central axis, the first end of the resonant cavity having an opening for receiving the open end of the container having the closure thereon;
    an electrode extending into the resonant cavity from the second end thereof and having a sealing rim therearound, the sealing rim including an outer edge located a predetermined length from the second end of the cavity along an outer peripheral surface of the electrode and located from the inner peripheral surface of the cavity by the predetermined length; and
    means connected to the electrode for exciting the cavity with electromagnetic energy to thereby seal the layer to the sealing rim of the container.

2. The sealing apparatus for use with a container as described in claim 1 wherein the sealing rim of the electrode has a predetermined thickness substantially equal to the thickness of the sealing rim of the container.

3. The sealing apparatus for use with a container as described in claim 1 wherein the electrode is located around the central axis of the resonant cavity.

4. The sealing apparatus for use with a container as described in claim 3 wherein the electrode includes a first portion and a second portion attached to the first portion, the second portion having a predetermined shape terminating in said sealing rim for supporting the closure of the container to be sealed.

5. The sealing apparatus for use with a container as described in claim 1 wherein the predetermined length is substantially equal to a quarter wavelength at a selected frequency of the electromagnetic energy in order to obtain a substantially maximized heating effect in an area of the seal.

6. The sealing apparatus for use with a container as described in claim 5 wherein the means for exciting is a source of electromagnetic energy at the selected frequency.

7. A sealing apparatus for use with a container having an open end with a sealing rim therearound, a closure on the open end and a membrane in the closure disposed against the sealing rim, the membrane having at least a plastic layer adapted for being sealed to the sealing rim of the container and a layer formed of a high dielectric loss tangent material, the apparatus comprising:
    a substantially single-mode resonant cavity having first and second ends, a central axis and an inner peripheral surface located around the central axis, the first end of the resonant cavity having an opening for receiving the open end of the container having the closure thereon;
    an applicator electrode extending into the resonant cavity from the second end thereof and having an open end with a sealing rim therearound for supporting the container, the sealing rim including an outer edge located a predetermined length from the second end of the cavity along an outer peripheral surface of the electrode and located from the inner peripheral surface of the cavity by the predetermined length; and
    means connected to the electrode for exciting the cavity with electromagnetic energy at a predetermined frequency to thereby seal the layer to the sealing rim of the container.

8. The sealing apparatus for use with a container as described in claim 7 wherein the sealing rim of the applicator electrode has a predetermined thickness substantially equal to the thickness of the sealing rim of the container.

9. The sealing apparatus for use with a container as described in claim 7 wherein the applicator electrode is located around the central axis of the substantially single-mode resonant cavity.

10. The sealing apparatus for use with a container as described in claim 9 wherein the applicator electrode includes a first portion and a second portion attached to the first portion, the second portion having a predetermined shape terminating in said sealing rim for supporting the closure of the container to be sealed.

11. The sealing apparatus for use with a container as described in claim 7 wherein the predetermined length is substantially equal to a quarter wavelength at the selected frequency of the electromagnetic energy in order to obtain a substantially maximized heating effect proximate to the seal.

12. A sealing apparatus for use with a container having an open end with a sealing rim therearound, a closure on the open end and a membrane in the closure disposed against the sealing rim, the membrane having at least a plastic layer adapted for being sealed to the sealing rim of the container and a layer formed of a high dielectric loss tangent material, the apparatus comprising:
    a substantially single-mode resonant cavity having first and second ends, a central axis and an inner peripheral surface located around the central axis, the first end of the resonant cavity having an opening for receiving the open end of the container having the closure thereon;
    an applicator electrode extending into the resonant cavity from the second end thereof and having an open end with a sealing rim therearound for supporting the container, the sealing rim including an outer edge located a predetermined length from the second end of the cavity along an outer peripheral surface of the electrode and located from the inner peripheral surface of the cavity by the predetermined length, and wherein the sealing rim has a predetermined thickness substantially equal to the thickness of the sealing rim of the container; and means connected to the electrode for exciting the cavity with electromagnetic energy at a predetermined frequency to thereby seal the layer to the sealing rim of the container, wherein the predetermined length is substantially equal to a quarter wavelength at the selected frequency of the electromagnetic energy.

* * * * *